United States Patent [19]
Cahalan

[11] Patent Number: 4,737,967
[45] Date of Patent: Apr. 12, 1988

[54] REMOTE MONITORING SYSTEM RECEIVER WITH DUAL BAUD RATE SELECTOR

[75] Inventor: Irving W. Cahalan, Huntington Station, N.Y.

[73] Assignee: Hazeltine Corporation, Greenlawn, N.Y.

[21] Appl. No.: 7,558

[22] Filed: Jan. 28, 1987

[51] Int. Cl.[4] .................... H04B 1/38; H04B 17/00
[52] U.S. Cl. .................................. 375/9; 340/310 A; 375/10
[58] Field of Search ........................ 375/8–10, 375/122, 121; 370/84, 118; 340/825.06, 825.17, 310 A; 379/97, 98

[56] References Cited
U.S. PATENT DOCUMENTS
4,069,392 1/1978 Goldenberg et al. ............ 375/9

OTHER PUBLICATIONS
Advanced Micro Devices, AmZ8030-AmZ8530(SCC), Product Description; Feb., 1983.

Primary Examiner—Robert L. Griffin
Assistant Examiner—Marianne Huseman
Attorney, Agent, or Firm—E. A. Onders

[57] ABSTRACT

A remote monitoring system (RMS) receiver which operates at a dual baud rate. The operating rate is selected to be the same as the rate being used by remote equipment originating the data link with the receiver. A modem associated with the receiver provides an indicator signal indicating phase shift keying (a high baud rate) or frequency shift keying (a low baud rate) is being received from the remote equipment. The indicator signal is used to select the baud rate of a programmable baud rate generator of the RMS receiver. This controls the baud rate signal which is supplied to an asynchronous interface controlling data transfer between the receiver and the modem.

7 Claims, 2 Drawing Sheets

4,737,967

REMOTE MONITORING SYSTEM RECEIVER WITH DUAL BAUD RATE SELECTOR

BACKGROUND OF THE INVENTION

1. Field of the Invention

The invention relates generally to receivers and in particular, a remote monitoring system receiver used with a power distribution network for providing information over the power lines of a network, said receiver having a dual baud rate selector.

2. Description of the Prior Art

Remote monitoring systems which are used in conjunction with power distribution networks are well known in the prior art. For example, U.S. Pat. Nos. 4,535,447, 4,550,416 and 4,583,073 describe the various features of remote monitoring system transmitters. These patents are assigned to the same assignee as this patent and are incorporated herein by reference. Remote monitoring system transmitters are associated with transformers to monitor transformer operation. Each transmitter is connected to the secondary power distribution network. At some remote point from the various transmitters, a remote monitoring system receiver is also connected to the secondary power distribution network. The transmitters and receivers communicate so that the receiver is provided with a summary of the information reflecting the status of each transformer having a transmitter.

The original system design of a remote monitoring system provided for access by remote equipment originating data links by means of a standard 300 baud telephone channel using off-the-shelf modem interfaces. This is compatible with most equipment that is available in the utility industry and, in particular, is compatible with portable terminals which are part of the utility operational plan for remote monitoring systems.

The proliferation of computing equipment, particularly, the availability of personal computers with auto dialers, has created a need for more flexible interfaces with the RMS systems. One feature that is in demand is the ability to run at a higher baud rate without sacrificing the capability of the 300 baud rate operation. Operation at a higher baud rate is an attractive feature but the 300 baud rate interface must be maintained. The functional requirement, therefore, is to have one or more ports of the RMS receiver operating automatically at either a 300 baud rate or a 1200 baud rate with the rate determined by the remote equipment originating the data link.

There are equipments available today that have the capability of responding to multiple baud rates automatically. However, these equipments generally use a software subroutine to identify the baud rate of the incoming data and iteratively adjust the responding baud rate to match. In contrast, the invention meets the requirement of providing both a B fixed low rate (300 baud) and a fixed high rate (such as 1200 baud) operation automatically at each data access point.

SUMMARY OF THE INVENTION

It is an object of this invention to provide a remote monitoring system receiver which can operate at a dual baud rate.

It is another object of this invention to provide a remote monitoring system transmitter which interfaces with a modem and selects baud rate operation in response to the indicator signal from the modem.

It is another object of this invention to provide a remote monitoring system receiver which will communicate at a baud rate which is the same as the baud rate of the remote equipment originating the data link.

The apparatus according to the invention comprises a remote monitoring system receiver. The receiver includes a processor having an input/output for receiving and transmitting data. The receiver also includes a clock for generating a clock signal and a baud rate generator receiving the clock signal and generating a high baud rate clock signal and a low baud rate clock signal. Modem means selectively receives/transmits data at the high baud rate and at the low baud rate. The modem means has an indicator means for detecting receipt of a high baud rate signal and for providing a high indicator signal in response thereto. The indicator means also detects a low baud rate signal and provides a low indicator signal in response thereto. A switcn means has a first input port receiving the high baud rate clock signal, a second input port receiving the low baud rate clock signal, a control input receiving the high indicator signal and the low indicator signal, and an output port. The output port of the switch means provides the high baud rate clock signal in response to receipt by the control input of the high indicator signal. The output port of the switch means provides the low baud rate clock signal in response to receipt by the control input of the low indicator signal. The apparatus also includes a storage register for receiving, storing and transmitting data between the processor and the modem in response to the baud rate signal provided by the output port of the switch means. The storage register means has a first rata port connected to the input/output of the processor, a second data port connected to the modem means and a clock port connected to the output port of the switch means.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

As shown in FIG. 1, remote monitoring system (RMS) receiver 1 includes a microprocessor 2, a crystal clock 3, a programmable baud rate generator 4 and a demodulator and detector is connected to a secondary 71 of a power distribution network. Receiver 1 communicates over the secondary 71 to RMS transmitters 72 which are also associated with the secondary 71. Such RMS transmitters are described in the above-cited patents and are associated with transformers 73 monitor transformer operation (see FIG. 2). The output from the crystal clock 3 is provided to the baud rate generator 4 so that a generator can be programmed to provide various baud rates. Generally, the invention contemplates any number of baud rates or specific rates may be provided. For simplicity and convenience in describing the invention, it is assumed that a high baud rate such as 1200 baud and a low baud rate such as 300 baud are desired for the preferred embodiment.

Figure 1:
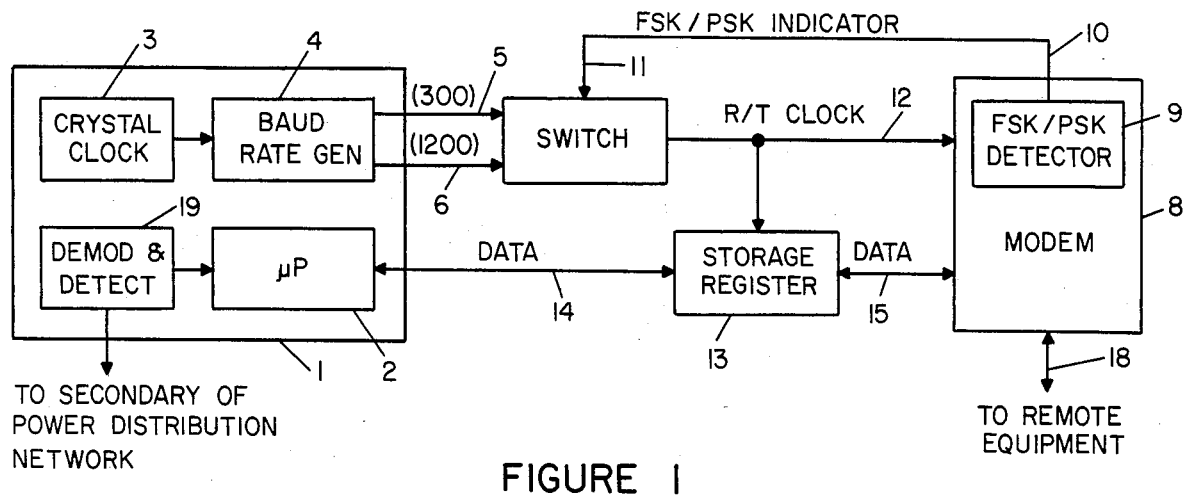
FIG. 1 is a block diagram of a remote monitoring system receiver in combination with other apparatus for providing dual baud rate operation according to the invention.

In general, the operating baud rate of the RMS receiver 1 is controlled by the programmable baud rate generator 4 operating in conjunction with an interface. However, the operating baud rate must match the rate of the remote equipment originating the data link. The interface operates in conjunction with a standard off-the-shelf modem. The standard for modems operating at 300 baud is to use freguency shift key (FSK) as the modulation technique. For 1200 baud and higher, phase shift key (PSK) modulation is employed. Current off-the-shelf modems which handle multiple baud rates, particularly the smart modem variety, contain internal circuitry to detect whether FSK or PSK data is being received and energize an indicator, such as a light, when the PSK mode is detected thereby indicating a high speed baud rate. Such modems then use a software subroutine to identify the particular baud rate of the incoming data and iteratively adjust the responding baud rate to match.

The FSK/PSK indicator is generally available as a control lead on most off-the-shelf modems. The invention relates to the sensing of tnis indicator and switcning between the vazious outputs of the baud rate generator 4 to output either the 300 baud clock or one of any higher baud rates with a minimum of circuitry. The invention provides this without the need for interaction on the part of a system operator or the need for specific software within the RMS receiver 1 to evaluate the incoming baud rate. No software subroutine to set a variable baud rate generator is required and the operator is not required to send a series of test characters to allow the software routine to iterate and set the correct baud rate clock.

In particular, baud rate generator 4 may be programmed to provide both a 300 baud rate via line 5 and a 1200 baud rate via line 6. Both these baud rates are provided to a single pole, double throw switch such as switch 7. Alternatively, switch 7 may be a logic switch or any other switch which would selectively switch between two or more incoming baud rate signals.

Modem 8 is a standard modem which is linked to remote equipment via telephone line 9. Included within modem 8 is a FSK/PSK detector 9 which evaluates data links originating from the remote equipment. Upon determining the format of the incoming signal, detector 9 provides an indicator signal via line 10 which indicates whether the incoming signal has an FSK format or a PSK format. This indicator signal is generally a voltage signal such as a +12 volt signal indicating PSK and a −12 volt signal indicating FSK. Line 10 is connected to the control input 11 of switch 7 such that switch 7 provides at its output 12 the baud rate corresponding to the indicator provided by detector 9. rn particular, if detector 9 detects an FSK signal and provides an FSK indicator such as −12 volts via line 10, switch 7 is then switched so that the incoming 300 baud rate via line 5 is provided to output 12. Alternatively, if detector 9 detects a PSK signal originating from the remote equipment and provided by telephone data link 18, then the PSK indicator is provided via line 10 such as a +12 volt signal resulting in switcn 7 connecting input 6 to output 12 so that the 1200 baud rate signal is passed.

Output 12 of switch 7 then provides the selected baud rate signal to modem 8 for synchronization and also to an asynchronous storage device such as register 13. Data from and to microprocessor 2 is provided to shift register 13 via line 14 and data from and to modem 8 is provided to shift register 13 via line 15. Essentially, storage register 13 is clocked by the selected baud rate to interface between the modem and the microprocessor so that data may be asynchronously transmitted.

Figure 2:
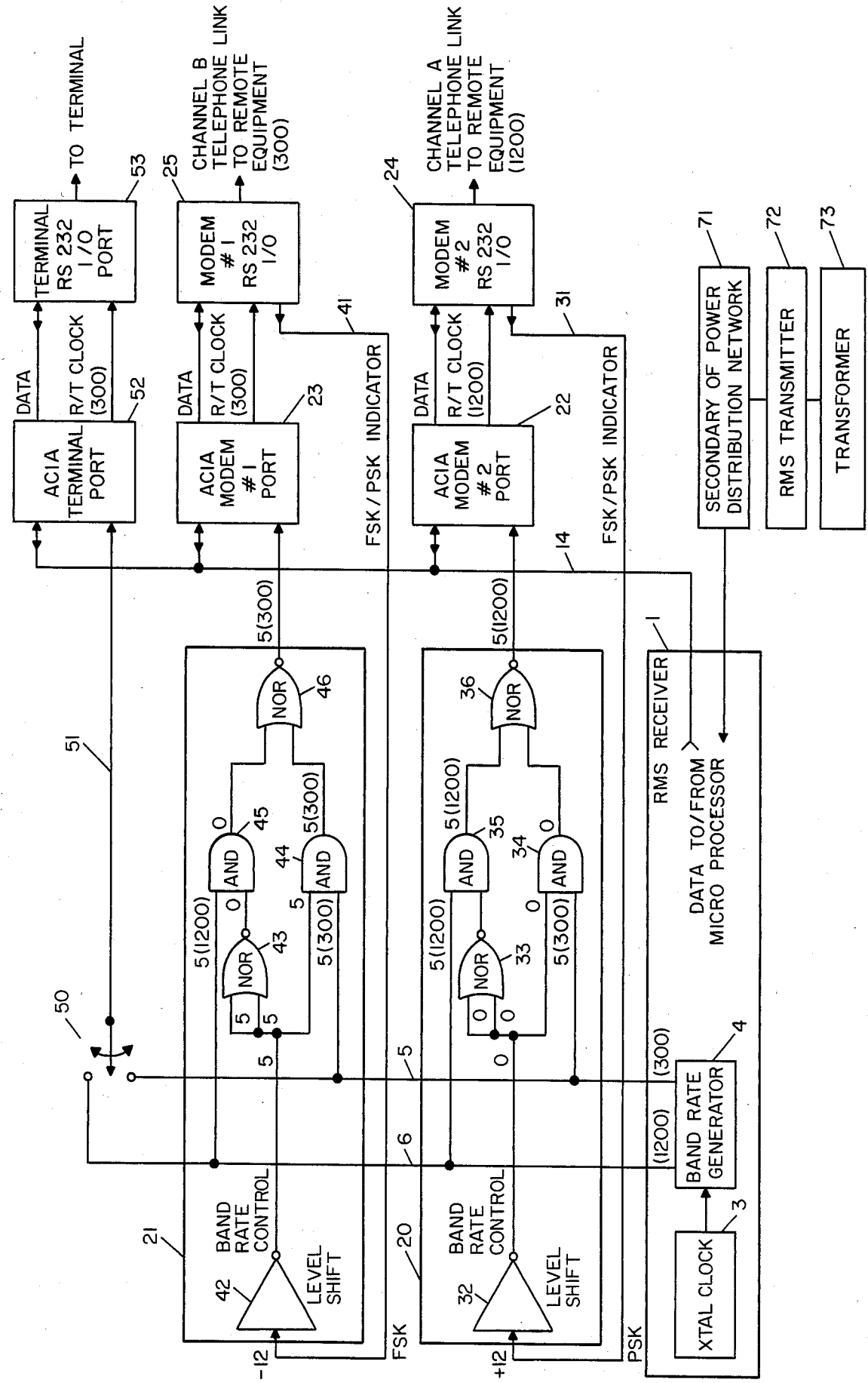
FIG. 2 is a detailed block diagram illustrating the functional operation of the invention as shown in FIG. 1.

Referring to FIG. 2, a more detailed diagram of the invention is presented with the same reference characters being used in both FIGS. 1 and 2 for corresponding structure. The embodiment of FIG. 2 is also an expanded version of the basic embodiment illustrated in FIG. 1. FIG. 2 shows the use of two separate telephone links for accessing RMS receiver 1. In this arrangement, switch 11 is replaced by logic switches 20 and 21. In addition, register 13 has been replaced by separate asynchronous communications interface adapters (ACIA) 22 and 23 which provide the interface between modems 24 and 25, respectively.

For illustrative purposes, ehannel A has been illustrated as communicating with remote equipment at a 1200 baud rate and channel B has been illustrated as communicating with remote equipment at a 300 baud rate. Referring to channel A, FSK/PSK detector of modem 24 provides the FSK/PSK indicator via line 31. In the case illustrated wherein channel A is communicating at a 1200 baud rate, line 31 would carry a PSK indication. Generally, off-the-shelf modems indicate a PSK signal by providing a +12 volt signal and indicate an PSK mode by providing a −12 volt signal. For channel A, line 31 would carry a 12 volt signal which would be applied to the input of level shift circuit 32. The input to level shift 32 is essentially the control port 11 of switch 7. Level shift circuit 32 is used to shift the indicator signal of the modem from the RS 232 format of +15 volts to logic levels of 0/+5 volts. The output of level shift circuit 32, therefore, shifts the +12 volt signal to a 0 volt signal which is provided to the inputs of NOR gate 33 and to one of the inputs of AND gate 34. The other input of AND gate 34 comes from line 5 and supplies the 5 volt signal toggled at a 300 baud rate. This signal is indicated in the drawing as 5 (300). NOR gate 33, which functions as an inverter, provides a 5 volt signal at its output because both of its input signars are 0 volts. The output of NOR gate 33 is provided as one of the inputs to AND gate 35. The other input to AND gate 35 comes from line 6 and provides the 5 volt signal toggled at a 1200 baud rate. This signal is indicated in the drawing as 5 (1200).

In the case of channel A, the remote equipment is functioning at 1200 baud so that AND gate 35 passes the 1200 baud signal since both its inputs are high whereas AND gate 34 does not pass the 300 baud signal because one of its inputs, i.e. the input from the level shift circuit 32, is 0. Finally, NOR gate 36 functions as a summer and passes the 5 volt signal toggled at 1200 baud received from the output of AND gate 25 because the other input of NOR gate 36, which comes from the output of AND gate 34, is always 0. This 1200 baud clock signal is provided to ACIA 22 which provides a data and clock interface between modem 24 and RMS receiver 1. ACIA 22, as well as ACIA 23, are standard off-the-shelf items well known in the prior art.

Referring now to channel B, this channel has been illustrated as operating with remote equipment at a 300 baud rate. Line 41 carries an FSK indicator of −12 volts which is provided to level snift circuit 42. The output of circuit 42 provides a corresponding +5 volt signal to the inputs of NOR gate 43 and one of the inputs of AND gate 44. The other input of AND gate 44 is provided by line 5 and is the 5 volt signal toggled at a 300 baud rate. Since both of the inputs of NOR gate 43 are high, its inverted output is low or 0 volts and is provided as one of the inputs of AND gate 45. The other input to AND gate 45 comes from line 6 and is the 5 volt signal toggled at a 1200 baud rate. In this channel B case, AND gate 44 passes the 300 baud rate signal whereas AND gate 45 does not pass the 1200 baud rate signal. NCR gate 46 functions as a summer and passes the 5 volt signal toggled at a 300 baud rate. This 300 baud rate signal is provided to ACIA 23.

The apparatus illustrated in FIG. 2 also may include a channel which can be directly connected to a terminal for accessing the RMS receiver 1. Switch 50 may be selectively connected to line 5 or line 6 to provide the appropriate baud rate for the remote terminal to be connected. The baud rate signal selected is provided via line 51 to ACIA 52 which is also connected to line 14 for receiving the data information. ACIA 52 will then form an interface between terminal port 53 and RMS receiver 1.

while there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An apparatus comprising:
    (a) a remote monitoring system receiver including:
        (i) a processor having an input/output for receiving and transmitting data;
        (ii) a clock for generating a clock signal; and
        (iii) a baud rate generator receiving the clock signal and generating a high baud rate clock signal and a low baud rate clock signal;
    (b) modem means for selectively receiving/transmitting data at the high baud rate and at the low baud rate, said modem means having an indicator means for detecting receipt of a nigh baud rate signal and providing a high indicator signal in response thereto and for detecting receipt of a low baud rate signal and providing a low indicator signal in response thereto;
    (c) switch means having a first input port receiving the high baud rate clock signal, a second input port receiving the low baud rate clock signal, a control input receiving the high indicator signal and the low indicator signal, and an output port providing the high baud rate clock signal in response to receipt by the control input of the high indicator signal, said output port providing the low baud rate clock signal in response to receipt by the control input of the low indicator signal; and
    (d) storage register means having a first data port connected to the input/output of the processor, a second data port connected to the modem means and a clock port connected to the output port of the switch means, said storage register means for receiving, storing and transmitting data between said processor and said modem means in response to the baud rate signal provided by the output port of the switch means.

2. The apparatus of claim 1 wherein said switch means comprises a single pole, double throw switch responsive to said indicator signal.

3. The apparatus of claim 1 wherein said switch means comprises:
    (a) a level shift circuit having an input connected to the output of said indicator means for receiving the indicator signal;
    (b) a first NOR gate having inputs connected to the level shift circuit output and having and output;
    (c) a first AND gate having one input connected to the baud rate ganerator for receiving the high baud rate clock signal, having another input connected to the first NOR gate output and having an output;
    (d) a second AND gate having one input connected to the baud rate generator for receiving the low baud rate clock signal, having another input connected to the output of the level shift circuit and having an output; and
    (e) a second NOR gate having one input connected to the first AND gate output, having another input connected to the second AND gate output and having an output port providing the high baud rate clock signal in response to receipt by the level shift circuit of the high indicator signal and providing the low baud rate clock signal in response to receipt by the level shift circuit of the low indicator signal.

4. The apparatus of claim 3 wherein said indicator means comprises:
    (a) means for detecting receipt of a frequency shift keyed signal and providing the low indicator signal in response thereto; and
    (b) means for detecting receipt of a phase shift keyed signal and providing the high indicator signal in response thereto.

5. The apparatus of claim 1 wherein said storage register means comprises an asynchronous communication interface adapter.

6. The apparatus of claim 1 wherein said receiver is associated with the secondary of a power distribution network.

7. The apparatus of claim 1 wherein said indicator means comprises:
    (a) means for detecting receipt of a frequency shift keyed signal and providing the low indicator signal in response thereto; and
    (b) means for detecting receipt of a phase shift keyed signal and providing the high indicator signal in response thereto.

* * * * *